Nov. 14, 1967  A. C. WARNER ET AL  3,352,046
DEFENSIVE WEAPON AND CARTRIDGE THEREFOR
Filed Jan. 6, 1966  5 Sheets-Sheet 1
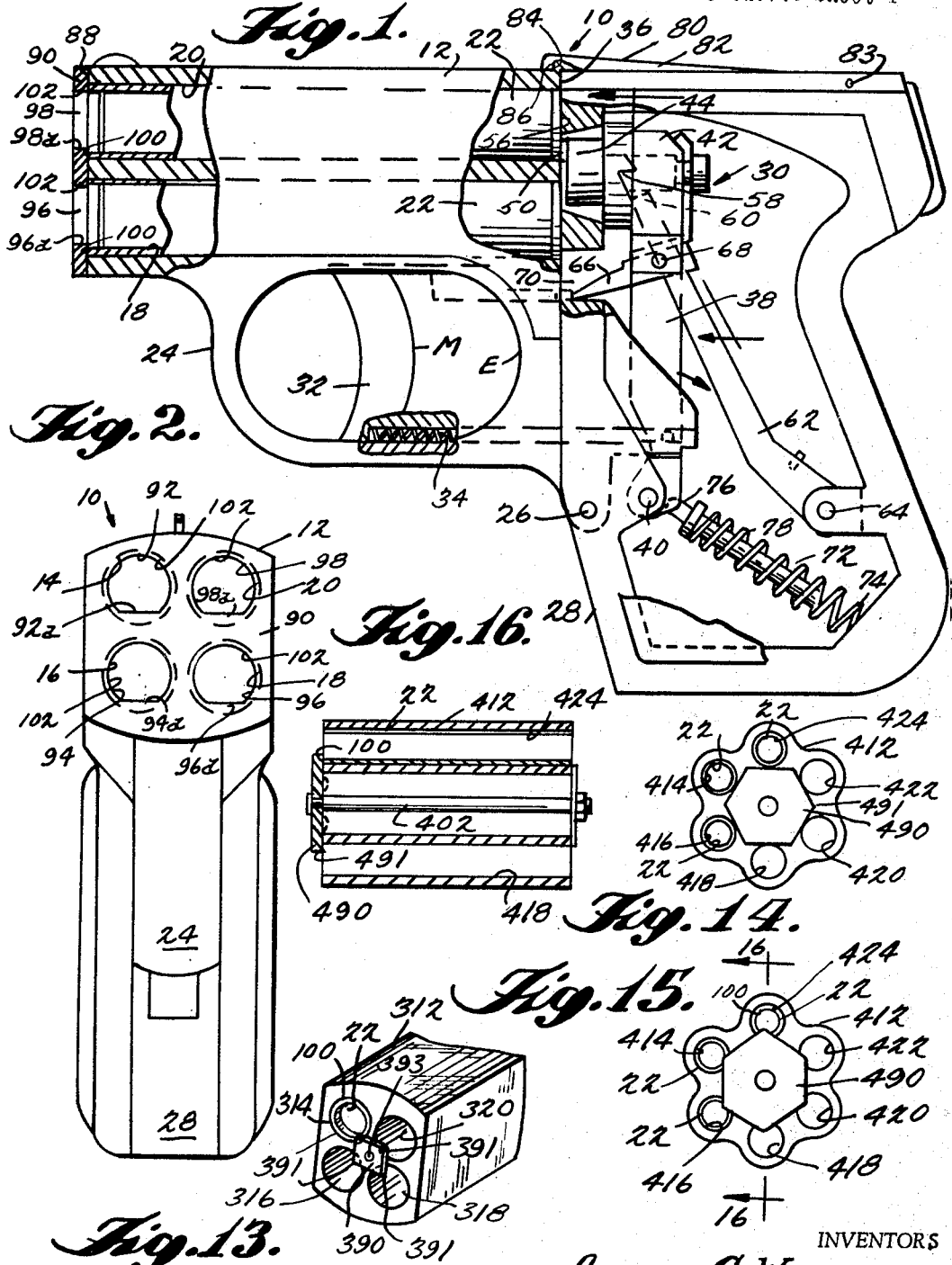
INVENTORS
ALBERT C. WARNER
MANTON E. ALLEN
BY Cushman, Darby & Cushman
ATTORNEYS INVENTORS
ALBERT C. WARNER
MANTON E. ALLEN
BY Cushman, Darby, Cushman
ATTORNEYS

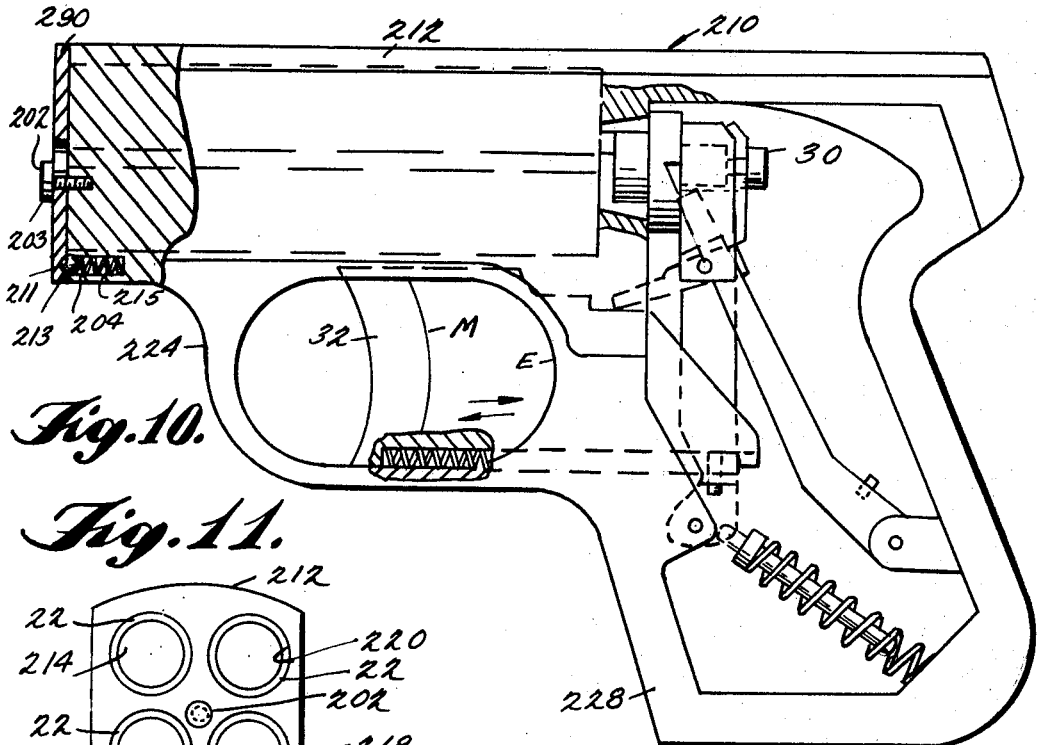
Nov. 14, 1967   A. C. WARNER ET AL   3,352,046
DEFENSIVE WEAPON AND CARTRIDGE THEREFOR
Filed Jan. 6, 1966   5 Sheets-Sheet 3
Fig. 10.
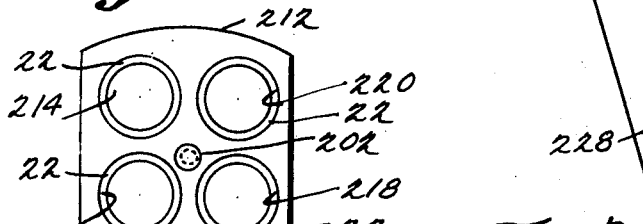
Fig. 11.
Fig. 12.
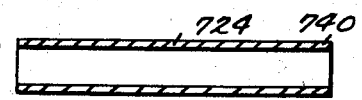
Fig. 23.
Fig. 24.
Fig. 25.
Fig. 22.
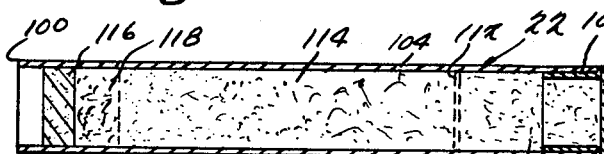
Fig. 8.
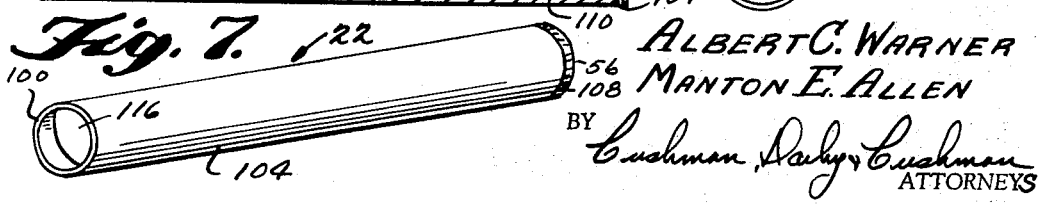
Fig. 9.
Fig. 7.
INVENTOR.
ALBERT C. WARNER
MANTON E. ALLEN
BY Cushman, Darby & Cushman
ATTORNEYS

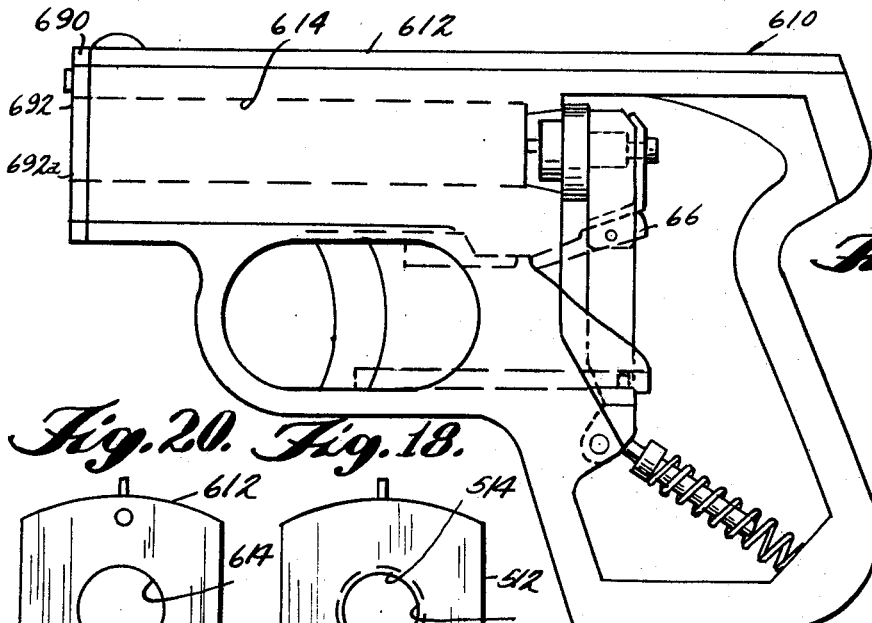
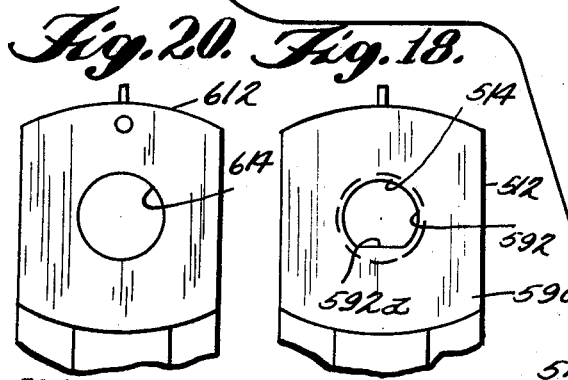
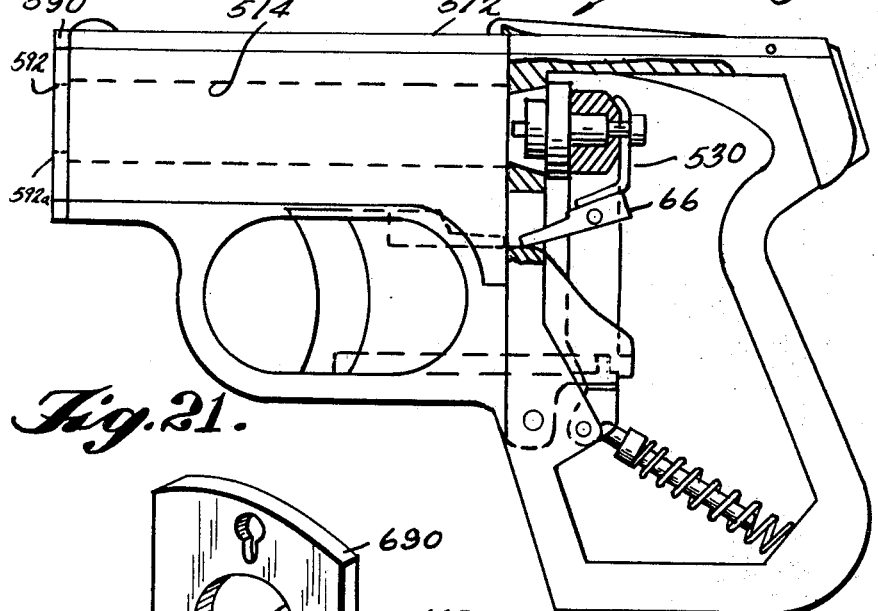
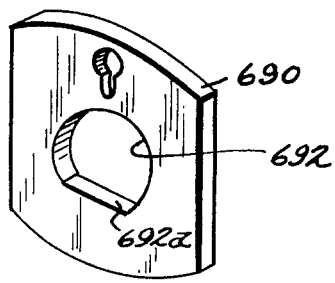

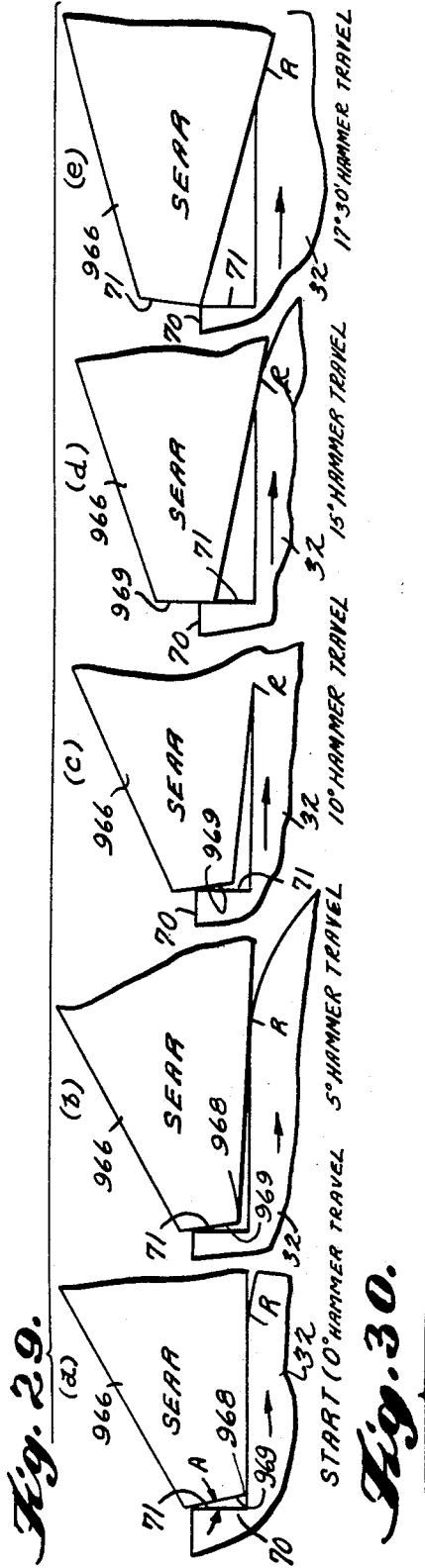
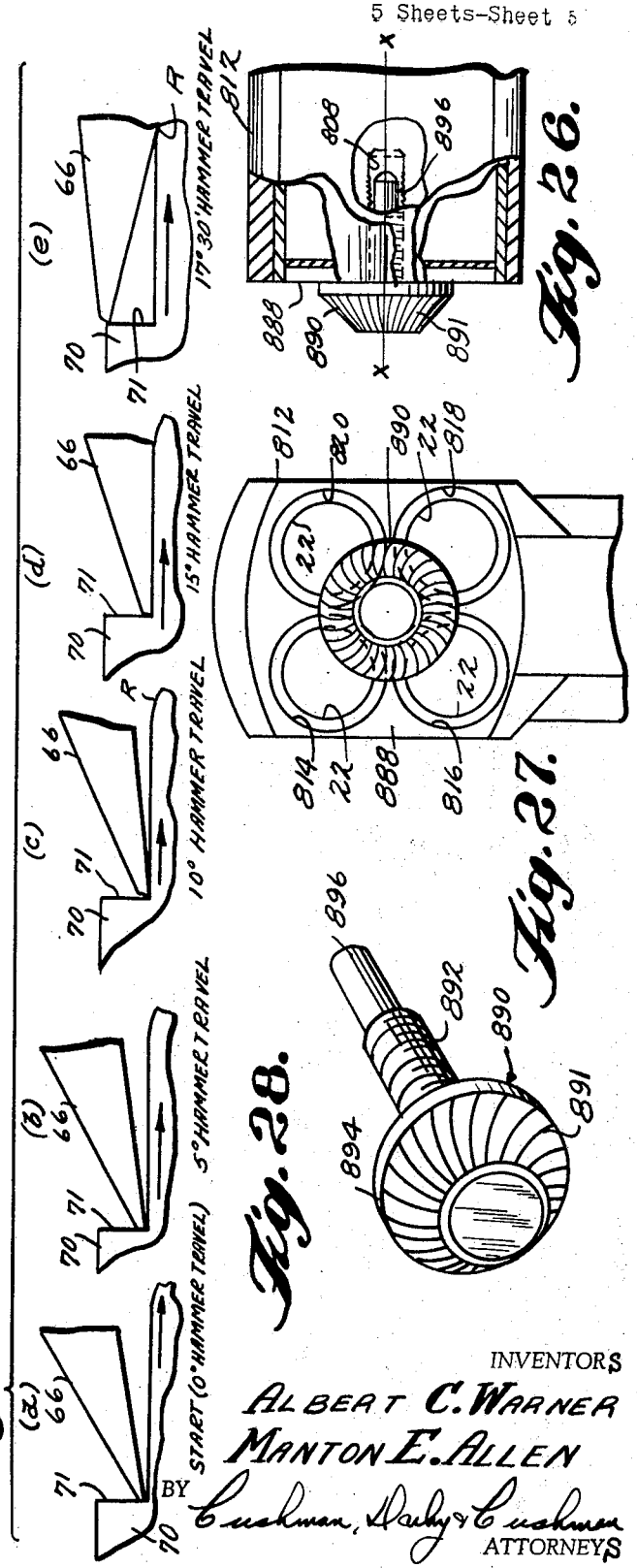

United States Patent Office 3,352,046
Patented Nov. 14, 1967

3,352,046
DEFENSIVE WEAPON AND CARTRIDGE THEREFOR
Albert C. Warner and Manton E. Allen, Santa Fe, N. Mex., assignors, by mesne assignments, to Warner Development Limited, Santa Fe, N. Mex., a limited partnership of New Mexico
Filed Jan. 6, 1966, Ser. No. 519,040
16 Claims. (Cl. 42—1)

ABSTRACT OF THE DISCLOSURE

A lachrymator discharge device having a barrel with one or more cylindrical bores for receiving rimless lachrymator charged cartridges having cylindrical exterior surfaces of substantially uniform diameter throughout their length. The length of each bore corresponds to the length of the cartridge to be received therewithin, and a muzzle plate is carried at the muzzle end of the device and intersects each bore to restrain the cartridge against longitudinal movement toward the muzzle end of the device when the cartridge is fired.

The present invention relates generally to defensive weapons and more particularly to an improved discharge device and cartridges therefor, for discharging and effectively dispersing a lachrymator such as tear gas or other suitable irritant substances capable of temporarily incapacitating assailants.

Tear gas discharge devices or tear gas guns, as they are commonly known, of the type contemplated by the present invention are employed for purposes of self defense and comprise hand weapons which can be conveniently carried by an individual on their person, such as in a pocket or purse, so as to be readily available for use. While such personal tear gas guns are increasingly in demand by a self defense conscious public alarmed with the burgeoning rate of violent crimes in many, if not most areas, prior tear gas gun and cartridge constructions suffer from various deficiencies and hence have not been completely satisfactory.

Typically, such prior efforts include the so-called "pocket" or "pen" type tear gas guns wherein there is provided only a single cartridge containing a relatively small or light lachrymator charge which has only a marginal deterrent effect over an extremely short range and severely limited area. Thus, attainment of even the marginal protection afforded by such prior tear gas guns requires not only that the tear gas gun user be undesirably proximate a would-be assailant, but also an accuracy in the direction or aiming of the lachrymator discharge toward such assailant's face which is difficult, if not impossible, to achieve under the exigencies of such situations. Moreover, the limited one shot capability of such prior art devices obviously only further impairs the deterrent potential thereof.

Prior efforts have also been made to provide larger lachrymator charges as well as multiple shot tear gas guns such as are shown in expired United States Patents No. 1,842,922 and No. 2,195,711. However such other prior art efforts suffer from various drawbacks not the least of which is their relatively complicated cumbersome constructions which render them not only costly to produce and difficult to assemble, but also unsuitable for use by members of the general public.

In addition, it is of course obviously highly desirable that such tear gas guns, which are to be used by the general public be able to effectively discharge tear gas cartridges, but also incapable of firing conventional live firearm ammunition.

Accordingly, it is a principal object of the present invention to provide an improved tear gas gun and tear gas cartridge construction.

Another object of the present invention is to provide tear gas gun and cartridge constructions which are relatively simple and inexpensive to manufacture and which are capable of discharging and dispersing a substantial lachrymator charge such as tear gas, over a relatively large range and area.

A further object of the present invention is to provide a tear gas gun of compact, light construction which can be conveniently carried by individuals so as to be readily available for purposes of self defense.

An additional object of the present invention is to provide an improved tear gas gun construction which while capable of discharging a substantial charge of lachrymator over a considerable range and dispersing the same over a relatively large area is incapable of firing conventionally available live ammunition.

A still further object of the present invention is to provide a tear gas hand gun of simple compact construction capable of firing immediately successive charges of a lachrymator such as tear gas so as to provide effective protection over a wide area.

Another object of the present invention is to provide an improved cartridge construction which is simple and inexpensive to manufacture and able to safely contain and discharge a sufficient quantity of a lachrymator such as tear gas to provide meaningful protection over a relatively large area.

A still additional object of the present invention is to provide a tear gas hand gun and a specially constructed tear gas cartridge therefor which can be manufactured and sold at a comparatively low cost and is more efficient and effective in operation than prior art devices.

Another object of the present invention is to provide a multiple shot tear gas hand gun which can be conveniently carried by an individual for purposes of self defense on his person and which is capable of firing a plurality of relatively large tear gas charges in rapid sequence without reloading between discharges.

Still another object of the present invention is to provide a tear gas gun construction which can be either multiple or single shot, and which after the initial load of tear gas has been expended, can be readily reloaded.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference is now made to the accompanying drawings which form a part hereof, wherein:

FIGURE 1 is a side elevational view partly in section of a breech loading tear gas gun embodying this invention, showing the trigger in the forward position and the hammer in position for the firing pin to operatively engage a tear gas cartridge;

FIGURE 2 is a front elevational view of the tear gas gun shown in FIGURE 1;

FIGURE 7 is a perspective view of a tear gas cartridge embodying the present invention;

FIGURE 8 is a side view in section of the tear gas cartridge shown in FIGURE 7;

FIGURE 9 is an elevational view of the discharge end of the tear gas cartridge illustrated in FIGURES 7 and 8;

FIGURE 10 is a side elevational view partly in section showing a modified form of the present invention;

FIGURE 11 is a front view of the muzzle end of the barrel of the modified form of the invention shown in FIGURE 10 with the muzzle plate removed;

FIGURE 12 is a front elevational view of the muzzle plate utilized in the modified form of the invention shown in FIGURE 11;

FIGURE 13 is a fragmentary perspective view of another modified form of the present invention;

FIGURE 14 is a front elevational view of still another modified form of the present invention showing the muzzle plate in loading position;

FIGURE 15 is a front elevational view of the modification illustrated in FIGURE 14 showing the muzzle plate in firing position;

FIGURE 16 is a fragmentary sectional side view taken along the line 16—16 of FIGURE 15;

FIGURE 17 is a side elevational view of still another modified form of the present invention;

FIGURE 18 is a fragmentary front elevational view of the muzzle of the modified tear gas gun illustrated in FIGURE 17;

FIGURE 19 is a side elevational view of another modified form of the present invention;

FIGURE 20 is a fragmentary front elevational view of the modification illustrated in FIGURE 19 with the muzzle plate removed;

FIGURE 21 is a perspective view of the muzzle plate utilized in the modification illustrated in FIGURE 19;

FIGURE 22 is a side elevational view in section showing a modified cartridge case construction embodying the present invention;

FIGURE 23 is a side elevational view in section of a tubular starting blank employed in forming the modified cartridge case construction illustrated in FIGURE 22;

FIGURE 24 is a side elevational view in section of the cartridge case blank at an intermediate stage in the formation of the modified cartridge case illustrated in FIGURE 22;

FIGURE 25 is a side elevational view in section of the base which is employed in the modified cartridge case construction illustrated in FIGURE 22;

FIGURE 26 is a fragmentary side elevational view of the muzzle end of a multiple shot tear gas gun embodying another modified form of the present invention;

FIGURE 27 is a front elevational view of the modified form of the invention shown in FIGURE 26;

FIGURE 28 is a front perspective view of the modified muzzle plate construction employed in modified form of the invention shown in FIGURE 26;

Figure 3:
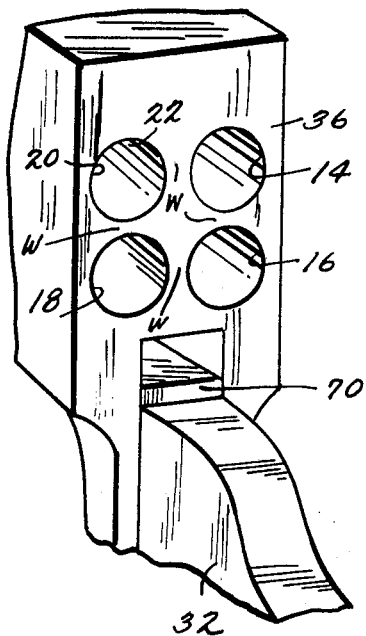
FIGURE 3 is a fragmentary perspective view showing the breech portion of the barrel of the tear gas gun shown in FIGURE 1.

FIGURE 29a–e comprises a plurality of side elevational views of a modified sear construction according to the present invention illustrating sequentially from FIGURE 29a through FIGURE 29e the progressive movement of the sear relative to the trigger during rearward firing movement of the trigger; and FIGURE 30a–e comprises a plurality of side elevational views of a conventional sear construction illustrating sequentially from FIGURE 30a through FIGURE 30e the movement of the conventional sear relative to the trigger during rearward firing movement of the trigger.

Referring now to FIGURES 1 and 2 of the drawings, there is shown a multiple shot, breech loading tear gas hand gun 10 having a barrel 12 including a plurality of fixed cylindrical bores 14, 16, 18 and 20, each of which is adapted to slidingly receive completely therein a rimless cylindrical tear gas cartridge 22. The barrel 12 is integral with a trigger carrying frame 24 which is pivotally connected to a handle frame 28 which operatively mounts a rotating firing pin assembly 30. Since the general arrangement of the multiple bore breech loading barrel 12 and the construction of the rotating firing pin assembly 30, as shown in the gun 10 of the present embodiment, is substantially similar to the multiple shot breech loading firearm construction illustrated in expired U.S. Patent No. 1,348,035 issued to Oscar F. Mossberg, the detailed disclosure of which is incorporated herein by reference, only a brief description of the barrel arrangement and rotating firing pin assembly will be provided herein.

Figure 4:
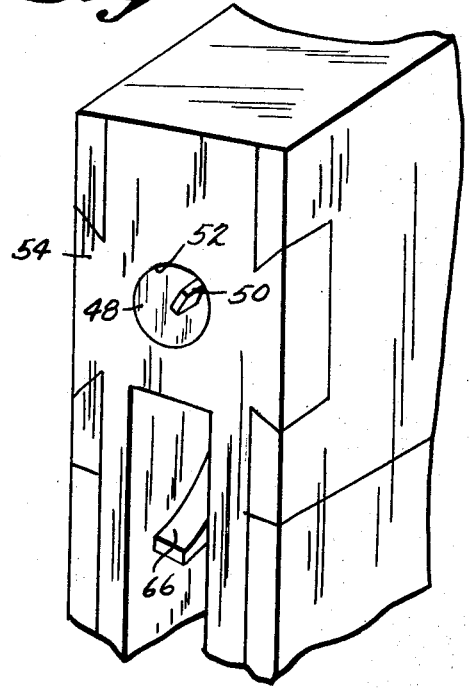
FIGURE 4 is a fragmentary perspective view of the face plate of the firing pin housing of the tear gas gun shown in FIGURE 1.
Figure 5:
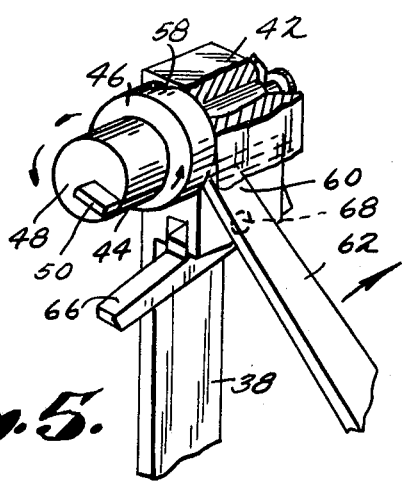
FIGURE 5 is a fragmentary perspective view showing the hammer and revolving firing pin assembly of the tear gas gun shown in FIGURE 1.
Figure 6:
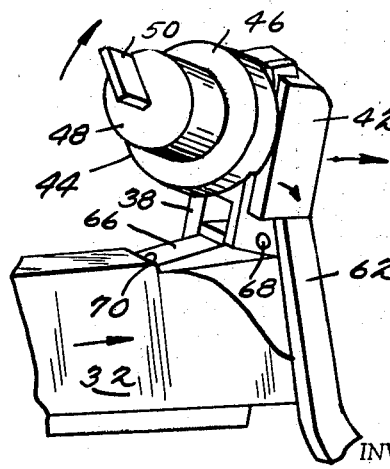
FIGURE 6 is a fragmentary perspective view of the hammer and revolving firing pin assembly shown in FIGURE 5 illustrating the movement of the hammer and firing pin during actuation of the trigger.

The trigger 32 is slidably carried by suitable guideways formed in the frame 24 for reciprocal movement longitudinally thereof and is normally urged in the direction of the muzzle or front end of the gun 10 by a suitable spring means 34. The frame 24 is pivotally connected to the forward side of the handle frame 28 by means of a transverse pivot pin 26 so that when the gun 10 is "broken," as for purposes of loading, the frame 24 and trigger 32 will swing clear of the handle frame 28 and out of possible engagement with the rotating firing pin assembly 30 so as to permit access to the breech 36. The rotating firing pin assembly 30 includes a hammer 38 which is pivotally mounted at its lower end to the handle frme 28 by suitable transversely extending pin means 40. The upper end or head 42 of the hammer 38 rotatably carries the firing pin 44. As best seen in FIGURES 4, 5, and 6, the firing pin 44 includes an enlarged flange portion 46 which carries at its forwardmost end face 48 a longitudinally extending firing projection 50 which is adapted to extend forwardly through the aperture 52 in the face plate 54 and beyond the forwardmost surface thereof into breech end of the bore with which it is operatively aligned so as to operatively engage the primer 56 of the tear gas cartridge 22 when the hammer 38 is in its forwardmost or firing position. At its rearmost end surface the flange portion 46 is provided with a plurality of circumferentially spaced notches 58 which correspond in number and circumferential or angular spacing to the number and angular spacing of the bores 14, 16, 18 and 20. The notches 58 are each adapted to receive and operatively engage the upper end 60 of an elongated dog 62 which is pivotally connected to the rear portion of the handle frame 28 by a suitable transversely extending pivot pin means 64. The engagement between the trigger 32 and the hammer is effected by means of dog or sear 66 which is pivotally mounted on the hammer 38 by a suitable transversely extending pin means 68. The forwardly facing free end of the sear 66 is adapted to engage a rearwardly facing shoulder 70 carried by the trigger 32 when rearward firing movement is imparted to the trigger. Forward firing movement is imparted to the hammer 38 and hence the firing pin 44 by a suitable compression spring assembly 72 disposed obliquely within the lower portion of the handle frame 28. The spring assembly 72 is arranged so that the lowermost end thereof 74 bears against the frame 28 and the uppermost end 76 pivotally engages the hammer 38 so that the spring 78 will be resiliently compressed when the hammer 38 is pivoted rearwardly by rearward firing movement of the trigger 32 and its reaction will rapidly urge the hammer forwardly when the sear 66 disengages the trigger 32.

The barrel 12 is releasably retained in firing position, as shown in FIGURE 1, by means of a suitable latch assembly 80. The latch assembly includes an elongated lever 82 which is pivotally carried as at 83 for vertical rocking movement by the top of the handle frame 28. At its forward end, the lever 82 is provided with vertically extending rearwardly facing shoulder means 84 adapted to interengage with forwardly facing upwardly extending shoulder means 86 carried by the uppermost surface of the barrel 12 when the same is in firing position.

Briefly, the action or operation of the gun 10 is as follows. With the breech closed so that the barrel 12 is in its firing position rearward firing movement of the trigger 32 will cause the shoulder 70 thereon to engage the forward end of the sear 66, as best seen in FIGURE 6, and swing or pivot the hammer 38 rearwardly about its pivot pin 40. During such rearward movement of the hammer 38, the uppermost end 60 of the elongated dog 62 engages within one of the notches 58 in the firing pin 44 so as to impart rotation thereto and thereby align the firing projection 50 with the next bore and the cartridge 22 therein to be fired. When the hammer 38 reaches a predetermined rearward position, wherein the firing pin 44 has been rotated sufficiently to achieve the aforementioned alignment of the firing projection 50 with a bore, the relative movements of the hammer 38 and trigger 32 will cause the dog 66 to slip from and disengage the shoulder 70, thereby releasing the hammer 38 which is rapidly thrown or snapped forward by the reaction of the compression spring assembly 72 to thereby cause the firing projection 50 to impact the primer of a cartridge 22 and effect fiiring thereof. After the trigger 32 has been permitted to return to its forwardmost position, rearward movement or "pulling" of the trigger will effect a rotational indexing of the firing pin 44 so that the firing pin 50 will be moved into alignment with the next circumferentially succeeding bore and cartridge so as to effect the firing thereof.

As best seen in FIGURES 1, 2, and 3 of the drawings according to the present invention, each of the bores 14, 16, 18, and 20 are identical and are of cylindrical form and of uniform diameter throughout their length which extends from the rearward face of the breech 36 to the muzzle 88 of the barrel 12 and corresponds to the entire length of a tear gas cartridge 22. In order to restrain the cylindrical tear gas cartridges 22 against longitudinal movement within their respective bores 14, 16, 18, and 20 and thereby both permit firing of the cartridge 22 under the forwardly directed impact of the firing pin 44, and prevent expulsion or discharge of the casing of the cartridge 22 from gun 10 on the firing thereof, an apertured muzzle plate 90 is permanently secured to muzzle 88. The apertured muzzle plate 90 which may be made integral with the barrel 12 or attached thereto by suitable joining or fastening means, such as welding, rivets, screws or the like, includes a plurality of apertures 92, 94, 96, and 98 which correspond in number to and are in axial alignment with the bores 14, 16, 18, and 20, respectively. Each of the apertures 92, 94, 96, and 98 are, as best seen in FIGURES 1 and 2, provided with at least one bore obstructing retaining portion 92a, 94a, 96a, and 98a, respectively, which serve to positively engage the forwardmost end edge 100 of each tear gas cartridge 22 and thereby restrain the same against forward movement longitudinally of the bores 14, 16, 18, and 20. Although it is not essential to the present invention, if desired, the apertures 92, 94, 96, and 98 may be dimensioned so as to be generally slightly smaller than the diameter of the bores 14, 16, 18, and 20 so as to provide a generally annular cartridge engaging rim or shoulder 102 throughout their remaining periphery. However, the provision of the retaining portions 92a, 94a, 96a, and 98a at the lowermost portions of the muzzle end of each bore is preferred for reasons to be more fully set forth hereinafter.

Referring now in particular to FIGURES 7, 8 and 9 of the drawings, the tear gas cartridges 22 of the present invention will be seen to comprise a shell formed by a cylindrical tubular member 104 into one end of which there is inserted, under a force fit, a primer 56 which in the illustrated embodiment is of the rim fire type. It will, of course, be obvious to those skilled in the art that the primer 56 can be of the center fire type, which, of course, would simply require the use of an appropriately configured and positioned firing projection 50 on the firing pin 44 to firingly engage the percussion cap of a center fire primer. While the tubular case 104 can be formed of any suitable rigid material, aluminum tubing having a wall thickness of 0.020 inch or more has been found particularly suitable when a .32 caliber rim fire primer is employed. As will be seen most clearly in FIGURE 7, the maximum outside diameter of the cartridge 22 is defined by the outside diameter of the cylindrical shell member 104 so that the cartridge 22 presents a smooth cylindrical surface throughout its length, free of any radially projecting rims such as are employed in conventional cartridge constructions and as those shown in the aforementioned U.S. Patents No. 1,842,922 and No. 2,195,711. While it has been previously indicated that the cylindrical portion 106 of the primer 56 may engage the interior of the tube with a force fit, a suitable adhesive material may be employed intermediate the primer 56 and the overlapping interior surface of the tubular shell 104 to effect a bond therebetween. In addition, while in the embodiment of the cartridge 22 shown in FIGURES 7 and 8 the radially outermost peripheral edge of annular base rim 108 of the primer 56 is shown as being flush with the outside cylindrical surface of the tubular cartridge shell 104, it will be clear that the rim 108 may terminate radially inwardly of the outer surface of the shell 104.

In addition to the primer charge, the tubular cartridge shell 104 contains in the following order from the primer 56 toward the opposite or discharge end of the cartridge 22, a charge comprising: suitable propellant charge 110 such as black powder; a separator means or wad 112; a suitable lachrymator charge 114, such as 12 grains of tear gas powder; and a suitable sealing wad 116. Optionally, a small amount of fluorescent micron powder 118, such as the type disclosed in U.S. Patent No. 3,084,466, which is adapted to fluoresce under exposure to ultraviolet light from a suitable source, may be included in the cartridge charge and is preferably interposed between the lachrymator charge 114 and the sealing wad 116.

When the tear gas cartridge 22 is positioned for firing within a bore, such as the bore 20, as best seen in FIGURES 1 and 3, the forwardmost end edge 100 of the cartridge case 104 will abut the retaining projection 98a of the muzzle plate 90 and the rearmost end surface of the primer 56 will be substantially flush with the breech end of the bore 20. When the cartridge 22 is fired by the striking of the firing projection 50 of the firing pin 44 on the rim fire primer 56, the fulminating charge within the primer 56 is exploded and ignites the propellant charge 110. The propellant charge 110, as soon as it is ignited, operates as a propellant for the lachrymator 114 and as a result of the pressure and heat which is produced by ignition of the propellant charge, gasifies the lachrymator 114. The explosive force of the propellant charge, in addition to causing a violent discharge and wide dispersion of the lachrymator, discharges the sealing wad 116 from the cartridge 22 and the bore 20 through the aperture 98 in the muzzle plate 90. In passing through the aperture 98 of the muzzle plate 90, the sealing wad engages, or is tripped by, the retaining projection 98a which imparts a tumbling motion to the wad and thereby causes the wad to follow a deteriorating trajectory and drop to the ground at only a relatively short distance from the muzzle of the gun 10.

While in the embodiment of the tear gas cartridge just described, the lachrymator charge 114 is illustrated as comprising a charge of suitable tear gas powder, the lachrymator charge 114 can comprise a suitable lachrymator substance in liquid form which is encapsulated in rupturable container, such as is illustrated in U.S. Patents No. 1,517,554; No. 1,750,101 and No. 2,204,085, the disclosures of which are incorporated herein by reference, which ruptures and discharges the liquid lachrymator upon firing of the cartridge 22.

When the tear gas cartridge 22 within the bores 14, 16, 18, and 20 have been expended from the gun 10 by firing, the latch means 80 is actuated to permit the gun 10 to be "broken" in the manner described in the aforementioned Mossberg Patent No. 1,348,035, and thereby permit the removal of the expended tear gas cartridges and the reloading of the bores with live tear gas cartridges 22.

Referring now to FIGURES 10, 11, and 12 of the drawings, there is shown a modified form of multiple shot tear gas gun 210 embodying the invention. The construction of the gun 210 differs from that of the gun 10, just described, in that the multiple bore barrel 212 and trigger frame 224 are integral with the handle frame 228, there being no pivotal connecton therebetween, and the apertured muzzle plate 290 is movably attached to the muzzle end of the barrel 212 so as to permit muzzle loading of the bores 214, 216, 218, and 220. While, as will be apparent to those skilled in the art, various releasable attachment means can be employed for securing the muzzle plate 290 to the muzzle end of the barrel 212, there is illustrated herein a simple fastening means comprising a projection means 202 having a radially extending flange or head 203 and a spring loaded ball detent assembly 204 carried by the muzzle end of the barrel 212 which are adapted to operatively interengage with the muzzle plate 290 and thereby retain the same in firing position on the muzzle end of the gun 210. To this end the muzzle plate is provided with a centrally disposed aperture 206 having an enlarged portion 208 and a smaller or reduced portion 209. The enlarged portion 208 of the aperture 206 is of a size larger than the head 203 of the projection means 202 so as to permit the same to pass therethrough while the size of the reduced portion 209 is smaller than the head 203. The inner face of the muzzle plate is provided with a recess 211 which is adapted to releasably receive the ball member 213 of the detent assembly 204, which is resiliently urged into engagement therewith by the spring means 215, when the projection means 202 is positioned within the reduced portion 209 of the aperture 206 and the muzzle plate is in operative firing position on the muzzle end of the barrel 212. In order to load the gun 210, it will be seen that it is only necessary to remove the muzzle plate 290, by sliding the same downwardly, relative to the barrel 212 so as to align the enlarged portion 208 of aperture with the retaining head 203 of the projection 202. Once the cartridges 22 have been inserted, primer first into each of the bores 214, 216, 218, and 220, the muzzle plate 290 is reassembled to its firing position on the muzzle end of the barrel 212 as shown in FIGURE 10, and the retaining projections 292a, 294a, 296a, and 298a will thereafter function in a manner similar to the retaining projections 92a, 94a, 96a, and 98a described hereinabove by reference to the gun 10 shown in FIGURES 1 and 2.

Referring now to FIGURE 13 of the drawings, there is shown another modified form of a movable muzzle plate 390 movably mounted on a tear gas gun barrel 312 embodying the invention. The construction of the movable muzzle pltae 390 differs from the movable muzzle plate 290 previously described in that it simply comprises a rectangular metal member rotatably mounted, by suitable pin means 393, at the muzzle end of the barrel 312. When in the firing position as illustrated in FIGURE 13, the corners 391 partially obstruct each of the bores 314, 316, 318, and 320 so as to operatively engage the forwardmost end edge of the tear gas cartridges 22 therein and thereby restrain the same against longitudinal movement relative to the bores. In order to effect muzzle loading of the barrel 312, it is simply necessary to rotate the muzzle plate 390 so as to move the corners 391 thereof out of bore obstructing position, i.e., to a position wherein the corners 391 overlie the portions of the barrel 312 intermediate the bores 314, 316, 318, 320, as shown in dotted lines in FIGURE 13.

Referring now to FIGURES 14, 15, and 16 of the drawings, there is shown a further modified form of a multiple bore barrel 412 having a movable muzzle plate 490 embodying the present invention. The barrel 412 differs from the barrel 312 just described in that the barrel 412 has six cylindrical bores 414, 416, 418, 420, 422, and 424 which, in the firing condition as shown in FIGURE 15, are partially obstructed by the corners or apices 491 of the hexagonally-shaped muzzle plate 490. As in the embodiment just described by reference to FIGURE 13, the corners 491, engage the forwardmost end edge 100 of each cartridge 22 within the bores so as to prevent longitudinal movement thereof during firing. In order to remove expended tear gas cartridges and reload the bores 414, 416, 418, 420, 422 and 424 with live tear gas cartridges 22, it is simply necessary to rotate the hexagonal muzzle plate 490 so as to position the corners 491 thereof intermediate the bores. As best shown in FIGURE 16, the hexagonal muzzle plate 490 may be rotatably mounted at the muzzle end of the multiple bore barrel 412 by means of a pin member 402 which extends longitudinally of the barrel intermediate the bores thereof.

Referring now to FIGURES 17 and 18 of the drawings, there is shown another modified form of a tear gas gun 510 embodying the invention. The construction of the gun 510 differs from that of the gun 10 previously described by reference to FIGURES 1 and 2, in that it is of a single shot breech loading construction and to that end has a barrel 512 having only a single tear gas cartridge receiving bore 514 and an integral muzzle plate 590 having a single aperture 592 with a retaining projection 592a. Of course, since the gun 510 is of single shot construction, the firing pin assembly 530 can be of a non-rotating or non-indexing construction.

Referring now to FIGURES 19, 20, and 21 of the drawings there is shown a further modified form of tear gas gun 610 embodying the invention. The construction of the gun 610 differs from that of the gun 210, aforedescribed by reference to FIGURES 10, 11 and 12 of the drawings, in that the muzzle loading gun 610 is of a single shot construction and to that end has a barrel 612 provided with a single cylindrical tear gas cartridge receiving bore 614 and a movable muzzle plate 690 having a single aperture 692 therein movably attached to the muzzle end of the barrel 612 and operatively alignable with the bore 614 therein. The retaining projection 692a functions in an identical manner to the retaining projections on the previously described muzzle plate constructions to engage the forwardmost end edge of the tear gas cartridge 22 and thereby restrain the cartridge against forward longitudinal movement during the firing thereof.

Referring now to FIGURES 22, 23, 24, and 25 of the drawings there is shown a modified two-piece cartridge 722 embodying the invention. The cartridge 722 comprises a cylindrical tubular shell member 724 which can simply be cut to the desired length from a length of extruded metal tubing such as steel, aluminum or brass and a metal primer base 726 which can be formed to the illustrated shape from metal bar stock of steel, aluminum or brass, by any suitable metal working techniques such as by coining or in an automatic screw machine. As best shown in FIGURE 25 the primer base 726 includes a body portion 728 having an exteriorly cylindrical surface corresponding generally in diameter to the inside diameter of the tubular shell 724. The forward or leading end of the primer base 726 is provided with an annular axially forwardly projecting rim or flange 730 which, together with the body 728 of the primer base, defines a generally cup-shaped recess 732 opening axially outwardly of the forward end of the primer. Adjacent its other end, or base, the primer body 728 is provided with an annular groove 734 defined by a conical surface section 736 of the body 728 which tapers radially inwardly toward the rear or base end of the primer so as to merge with the radially outwardly extending annular base flange 738 thereof.

The primer base 726 is inserted into one end of the tubular shell 724 so that the end portion 740 thereof overlies the annular groove 734 in the primer base 726. Thereafter the tubular end portion 740 is crimped radially inwardly into the annular groove 734 and into engagement with the underlying conical surface 736 to effect assembly of the primer base 726 to the tubular shell 724. The primer base 726, as is conventional, is provided with a suitable, centrally disposed axially extending bore 750 which is adapted to receive a conventional fuse cap or percussion cap (not shown).

When the cartridge 722 is fired, the explosive forces acting radially outwardly (as shown by arrows in FIGURE 22) within the cup-shaped recess 732 will tend to deform the annular flange 730, radially outwardly into firmer sealing engagement with the overlying inner cylindrical surface portion of the tubular shell 724. If the cartridge 722 is to be employed as a tear gas cartridge for use in the aforedescribed tear gas gun construction, it is of course necessary to ensure that the outward radial extent of the primer base flange 738 does not exceed the maximum outside diameter of the tubular shell 724. However, in the event it is desired to employ the construction of the cartridge 722 for ballistic purposes in conventional firearms, the primer base flange 738 can be dimensioned so as to project radially outwardly beyond the outside diameter of the tubular shell 724, as shown by dotted lines in FIGURE 22. In this regard when it is desired to employ the cartridge 722 for ballistic purposes in conventionally chambered firearms, the tubular shell 724 may be formed to the shape indicated at 752 in FIGURE 24. The shaping of the cylindrical tubing 724 to a shell having the configuration indicated at 752 in FIGURE 24 can be accomplished by inserting the tubular shell 724 in a suitable die means (not shown) and expanding the tube 724 to the conventional shell form indicated at 752.

In this latter case the completed cartridge case would vary from the configuration of the cartridge 722 aforedescribed as shown by the dotted lines in FIGURE 22.

While for the purposes of illustrating the various embodiments of the invention, considerable reference has been made to the multiple shot, rotating firing pin construction illustrated in U.S. Patent No. 1,348,035 it will be appreciated by those skilled in the art that other successively indexing or rotating firing pin constructions can be employed. In addition it is appropriate to note here that when the multiple shot tear gas gun construction illustrated herein is employed, a safety mark M may be provided on the trigger 32 at the appropriate location, as best shown in FIGURE 1 of the drawings. The safety mark M comprises a line or other indicia located about midway between the leading edge of the trigger 32 and the rear edge E of the trigger guard, i.e., the line M is located at a distance from the rear edge E of trigger guard which corresponds to one half the distance the trigger 32 must be moved rearwardly to effect a complete indexing of the firing projection 50 from one bore to the next bore in firing succession. Thus, when the trigger 32 is pulled back only far enough to align the safety mark M with the rear edge E of the trigger guard and then released, the firing projection 50 will have rotated only part of the necessary indexing distance and will be aligned and engaged with a web portion W of the barrel 12 which lies intermediate the bores 14, 16, 18, and 20, as best seen in FIGURE 3, and thus be in a safe condition.

Referring now to FIGURES 26, 27, and 28 of the drawings there is shown another modified form of a movable muzzle plate means or muzzle screw 890 removably mounted in a threaded blind hole or socket 808 at the muzzle end 888 of a multiple bore tear gas gun barrel 812 embodying the invention. Preferably, the cylindrical cartridge receiving bores 814, 816, 818, and 820 are uniformly angularly spaced from one another about, and uniformly spaced from, the central longitudinal axis $x$—$x$ of the barrel 812. As best seen in FIGURES 26 and 28 the muzzle screw 890 comprises a threaded cylindrical shaft portion 892 which terminates at one end in an enlarged generally circular head 894 having a knurled exterior gripping surface 891 to facilitate gripping of the muzzle screw during its assembly with, and removal from, the socket 808 of the barrel 812. At its other end the shaft 892 terminates in an axially extending unthreaded pilot portion 896 of reduced diameter which facilitates operative alignment and interengagement of the threads on the shaft 892 with the mating threads on the interior of the threaded socket 808. As shown in FIGURE 26, the depth or axial extent of the threaded socket 808 is sufficient to permit the threaded shaft 892 and the pilot 896 of the muzzle screw 890 to be completely received therewithin so that the enlarged head 894 thereof will firmly abut or engage the end face of the muzzle 888 when the muzzle screw 890 is operatively assembled and tightened within the socket 808 of the barrel 812. Since the socket 808 is concentric with the central longitudinal axis $x$—$x$ of the barrel 812 and the radius of the enlarged circular head 894 of the muzzle screw 890 is greater than the minimum radial spacing of the bores 814, 816, 818, and 820 from the axis $x$—$x$, when the muzzle screw 890 is assembled in its firing position at the muzzle end 888 of the barrel 812 as shown in FIGURES 26 and 27, the enlarged head 894 will partially obstruct muzzle end of each of the bores so as to operatively engage the forwardmost end edge of each of the tear gas cartridges therein and thereby restrain the same against longitudinal movement relative to the bores.

In order to effect muzzle loading of the bores 814, 816, 818 and 820 of the barrel 812, it is simply necessary to unscrew and remove the muzzle screw 890 from the threaded socket 808 and insert the cartridges 22 within the bores. Thereafter, of course, in order for the gun to be placed in firing condition, the muzzle screw 890 must be replaced by being threaded into the socket 808 until the enlarged head 894 firmly abuts the end face of the muzzle 888 of the barrel 812.

Referring now to FIGURE 29 of the drawings there is shown a modified sear 966 which can be advantageously employed in both the multiple and single shot tear gas gun constructions previously described wherein the trigger, sear and hammer assembly is substantially similar to that disclosed in U.S. Patent No. 1,348,035. The construction of the sear 966 differs from that of the sear 66, previously described by reference to FIGURES 1, 4, 5 and 6 and illustrated in FIGURE 30 for convenience of comparison, in that the forwardly facing free end 968 thereof which engages the shoulder 70 on the trigger 32 during rearward firing movement of the trigger is of a greater vetical extent than the trigger shoulder 70 and is undercut so as to provide a beveled face 969. As best seen in FIGURE 29a, at the moment of initial interengagement of the sear face 969 with the trigger shoulder 70 during rearward firing movement of the trigger 32 (as indicated by the arrow) the sear face 969 engages the upper edge of shoulder 70 and diverges from the substantially vertical trigger shoulder face 71 toward the underlying trigger surface to define with the shoulder face 71 an acute interior angle A, which is preferably within the range of six (6) to ten (10) degrees. During continued rearward firing movement of the trigger 32 as illustrated in FIGURES 29b, c, d and e, the sear 966 will be seen to pivot on the rock point R of the trigger 32 and continuously move upwardly relative to the trigger shoulder 70 until at the trip point shown in FIGURE 29e the lower edge of the beveled sear face 969 is immediately adjacent the uppermost edge of the trigger shoulder 70 so that upon continued rearward firing movement of the trigger 32 the sear 966 will disengage the trigger shoulder 70 to thereby release the hammer, to which it is pivotally connected, and thereby effect firing of the gun. The smooth continuous movement of the sear 966 relative to the shoulder face 71 from its starting or initial contact position (FIGURE 29a) to its trip point (FIGURE 29e) during rearward firing movement of the trigger 32 is to be contrasted with the rather abrupt or irregular movement of the conventional sear 66 from its starting or initial contact position (FIGURE 30a) to its trip point (FIGURE 30e). Thus as best seen in FIGURE 30 the free end face 69 of the conventional sear 66 has a vertical extent less than the trigger shoulder 70, and is not undercut, but rather is formed so as to be either parallel with the substantially vertical shoulder face 71 or overcut so as to diverge from the shoulder face 71 toward the upper edge of the shoulder 70, i.e. define a small exterior angle with the opposed shoulder face 71. As illustrated in FIGURES 30a, b, c, d and e during most of the rearward firing movement of trigger 32 the conventional sear 66 merely pivots angularly and does not move upwardly relative to the shoulder face 71 until almost the end of the trigger movement when it abruptly moves to its trip point as shown in FIGURE 30e. In each of the embodiments illustrated herein the angular movement of the hammer from its forwardmost or firing position to its fully cocked position, i.e. the trip point of the sear, is 17° 30'. Thus in FIGURE 30 it will be seen that the relative upward movement of the sear 66 from its point of initial contact with the trigger shoulder to its trip point occurs only during the last two to three degrees of hammer travel when the interengaging pressure of the sear 66 with the shoulder 70 is at a maximum due to compression of the compression spring assembly 72 (see FIGURE 1). In contrast, the modified sear 966 moves continuously upward relative to the shoulder 70 during the entire 17° 30' path of angular movement of the hammer to thereby provide an obviously desirable smooth and relatively uniform "feel" to a person actuating the trigger 32.

It will thus be seen that the objects of this invention have been fully and effectively accomplished. It will be realived, however, that the foregoing specific embodiments have been shown and described only for the purpose of illustrating the principles of this invention and are subject to extensive change without departure from such principles. Therefore, this invention includes all modifications encompassed within the spirit and scope of the following claims.

We claim:

1. A device of the character described comprising in combination: a barrel means terminating at one end in a muzzle end and at the other end in a breech; at least one cylindrical bore in said barrel extending axially thereof from said breech to said muzzle end thereof, said bore being adapted to slidingly receive completely therewithin a cartridge of a length corresponding to the length of said bore and having a cylindrical exterior surface of substantially uniform diameter throughout its length; a muzzle plate means at the muzzle end of said barrel, said muzzle plate means having restraining means intersecting said bore so as to present a transverse abutment surface adapted to engage the end edge of a cartridge operatively disposed within said bore so as to restrain the cartridge against longitudinal movement relative to said bore toward the muzzle end thereof; trigger means; and firing means adjacent said breech end of said bore and operatively responsive to actuation of said trigger means to fire a cartridge operatively positioned within said bore.

2. The structure defined in claim 1 wherein the muzzle plate means is integral with said barrel and the breech is movable relative to the firing means so as to permit access to the bore for inserting live cartridges therein and removing expended cartridges therefrom.

3. The structure defined in claim 1 wherein the muzzle plate means is movably attached to the barrel whereby it may be moved out of obstructing relation with the bore so as to permit muzzle loading of said bore with a cartridge.

4. The structure defined in claim 1 wherein the barrel contains a plurality of angularly spaced cylindrical bores extending parallel to one another axially of the barrel from the breech to the muzzle end thereof; the muzzle plate means includes restraining means intersecting the muzzle end of each bore; and the firing means is operative to successively fire cartridges within each of said bores upon repeated actuation of said trigger means.

5. The structure defined in claim 4 wherein the muzzle plate means is integral with the barrel and the breech thereof is movable out of operative association with said firing means so as to permit access to the bores for inserting live cartridges therein and removing expended cartridges therefrom.

6. The structure defined in claim 4 wherein the muzzle plate means is movable relative to the muzzle end of the barrel whereby the restraining means carried thereby can be moved out of intersecting relation with each of said bores so as to permit the muzzle loading thereof with cartridges.

7. The structure defined in claim 6 wherein said muzzle plate means comprises a plate having a plurality of non-circular apertures corresponding in number to the number of bores which are each operatively alignable coaxially with one of said bores.

8. The structure defined in claim 6 wherein said muzzle plate means comprises a polygonal plate means having the same number of lateral side edges as there are bores and of a size such that the corners formed by the intersection of said side edges will each operatively intersect one of said bores and thereby provide abutment surfaces adapted to engage the end edge of the cartridge within each of said bores.

9. The structure defined in claim 4 wherein the firing means comprises a rotatable firing pin assembly having a firing projection successively movable by rotation to positions for firing the cartridges in the respective bores and means operatively responsive to actuation of the trigger means to rotate said firing projection.

10. The structure defined in claim 9 wherein the device includes: a frame; the trigger means is mounted for movement relative to said frame; and indicia means operative to indicate by observation when actuation of said trigger means has been sufficient to effect only part of the angular rotation of the firing projection necessary to move the same to an operative position with respect to a successive bore whereby discontinuance of the actuation of said trigger means and the movement thereof back to its unactuated position when said indicia means is operative will result in said firing projection being disposed in a safe position intermediate successive barrels.

11. A device of the character described comprising in combination: a barrel means terminating at one end in a muzzle end and at the other end in a breech; plurality of cylindrical bores in said barrel extending axially thereof, said bores being uniformly angularly spaced from one another about and uniformly spaced radially from, a longitudinal axis of said barrel; a rimless cartridge having a cylindrical exterior surface of uniform diameter substantially throughout its length disposed within each of said bores and extending from the breech end thereof to the muzzle end thereof; a movable muzzle plate means carried at said muzzle end of said barrel, said muzzle plate means having restraining means intersecting each of said bores at their muzzle end so as to engage an end edge of each cartridge within said bores so as to restrain each cartridge against longitudinal movement toward said muzzle end; trigger means; and firing means operative to successively align with and fire the cartridges within each of said bores upon successive repeated actuation of said trigger means.

12. The structure defined in claim 11 wherein the muzzle plate means comprises a non-circular plate rotatably carried at the muzzle end of the barrel for rotation about the longitudinal axis of the barrel from which the bores are equally radially spaced, said non-circular plate including a plurality of restraining projections having a radial extent from the center of rotation of said plate greater than the minimum radial spacing of said bores therefrom and portions intermediate said restraining projections having a radial extent from said center of rotation not exceeding the minimum radial spacing of said bores therefrom, the number of said restraining projections corresponding to the number of bores whereby said non-circular plate can be rotated from a position wherein said restraining projections thereon intersect said bores and operatively engage the end edges of cartridges in said bores to positions intermediate said bores to permit muzzle loading of the device.

13. A device of the character described comprising in combination: a barrel means terminating at one end in a muzzle and at the other end in a breech; a plurality of cylindrical bores of uniform length in said barrel extending axially thereof each of said bores being uniformly spaced radially from a longitudinal axis of said barrel and adapted to slidingly receive completely therewithin a cartridge of a length corresponding to the length of a bore and having a cylindrical exterior surface of substantially uniform diameter throughout its length; an axially extending threaded socket in said barrel at the end of the muzzle intermediate said bores; an extension having threads interengageable with the threads in said socket; an enlarged head at one end of said extension adapted to abut the end face of said muzzle when said extension is threaded into said socket and provide a transverse abutment surface at the muzzle end of each of said bores so as to engage the end edge of each cartridge operatively disposed within said bores and thereby restrain each cartridge against longitudinal movement in the direction of said muzzle end; trigger means; and a firing pin means operative to successively align with and fire the cartridges within each of said bores upon successive actuation of said trigger means.

14. The structure defined in claim 13 wherein the threaded extension includes a reduced pilot extension at its other end to facilitate alignment of the threaded extension with the socket.

15. The structure defined in claim 13 wherein said trigger means is slidably mounted for reciprocative rectilineal movement and has a shoulder extending normal to the direction of said rectilineal movement; the firing pin means includes a pivotally mounted hammer having an elongated sear pivotally mounted thereon and the free end of said sear which is adapted to releasably engage the shoulder during firing movement of said trigger means is beveled so as to diverge from said shoulder toward the underlying portion of said trigger means whereby said free end of said sear will move continuously relative to said shoulder to its trip point during firing movement of said trigger means.

16. In a firearm of the type including a pivotally mounted hammer; a trigger slidably mounted for reciprocative rectilineal movement having a shoulder extending substantially normal to the direction of movement of said trigger and an elongated sear pivotally connected at one end to said hammer so that the free end of said sear is releasably engageable with said shoulder during firing movement of said trigger to move said hammer through a predetermined arc and thereupon at its trip point disengage from said shoulder so as to permit firing movement of said hammer the improvement comprising: an undercut on the free end of the sear to provide a beveled face diverging from the shoulder toward the underlying portion of the trigger so that the free end of the sear will move continuously relative to said shoulder to its trip point during firing movement of said trigger.

No references cited.

BENJAMIN A. BORCHELT, *Primary Examiner.*